(12) United States Patent
Olk et al.

(10) Patent No.: US 6,772,923 B2
(45) Date of Patent: Aug. 10, 2004

(54) METHOD FOR ANCHORING AN ELASTOMER INTO A THERMOPLASTIC DURING INJECTION MOLDING

(75) Inventors: Olaf Olk, Hauppauge, NY (US); Ralph H. Pena, Fletcher, NC (US)

(73) Assignee: Spotless Plastics Pty. Ltd., Victoria (AU)

( * ) Notice: Subject to any disclaimer, the term of this patent is extended or adjusted under 35 U.S.C. 154(b) by 129 days.

(21) Appl. No.: 10/108,775

(22) Filed: Mar. 28, 2002

(65) Prior Publication Data

US 2003/0183665 A1 Oct. 2, 2003

(51) Int. Cl.$^7$ .............................................. A41D 27/22
(52) U.S. Cl. ............................................... 223/85
(58) Field of Search .................. 223/85; 268/328.1, 268/328.5

(56) References Cited

U.S. PATENT DOCUMENTS

| | | |
|---|---|---|
| 3,577,596 A | 5/1971 | Bullard et al. |
| 4,058,241 A | 11/1977 | Craig |
| 4,335,068 A | 6/1982 | Hemery |
| 4,416,602 A | 11/1983 | Neumeister |
| 4,606,482 A | 8/1986 | McHugh |
| 4,655,867 A | 4/1987 | Berkovits |
| 4,711,621 A | 12/1987 | Schomblond |
| 5,020,705 A * | 6/1991 | Garrison ...................... 223/96 |
| 6,085,950 A * | 7/2000 | Gouldson et al. ............. 223/85 |

FOREIGN PATENT DOCUMENTS

| | | |
|---|---|---|
| EP | 0 812 669 A | 12/1997 |
| FR | 2 473 949 | 7/1981 |
| GB | 2 242 122 A | 12/1991 |
| GB | 2 290 226 A | 12/1995 |

* cited by examiner

Primary Examiner—John J. Calvert
Assistant Examiner—James G Smith
(74) Attorney, Agent, or Firm—Scully, Scott, Murphy & Presser

(57) ABSTRACT

A molded plastic garment hanger constituted from first and second plastic materials which are fused and mechanically bonded to form a composite garment hanger. A coinjected plastic member formed of the second plastic material is molded into the plastic body member formed of the first plastic material, and is secured thereto by a plume of the second plastic material of the coinjected plastic member which is formed as the second plastic material is coinjected and breaches the surface of the first plastic material of the molded plastic body member which is not completely set and hardened, such that the plume of the second plastic material extends into and is secured and anchored into the first plastic material. A method and apparatus for co-injection molding of plastic materials for the formation of the plastic garment hanger construction are also disclosed.

9 Claims, 3 Drawing Sheets

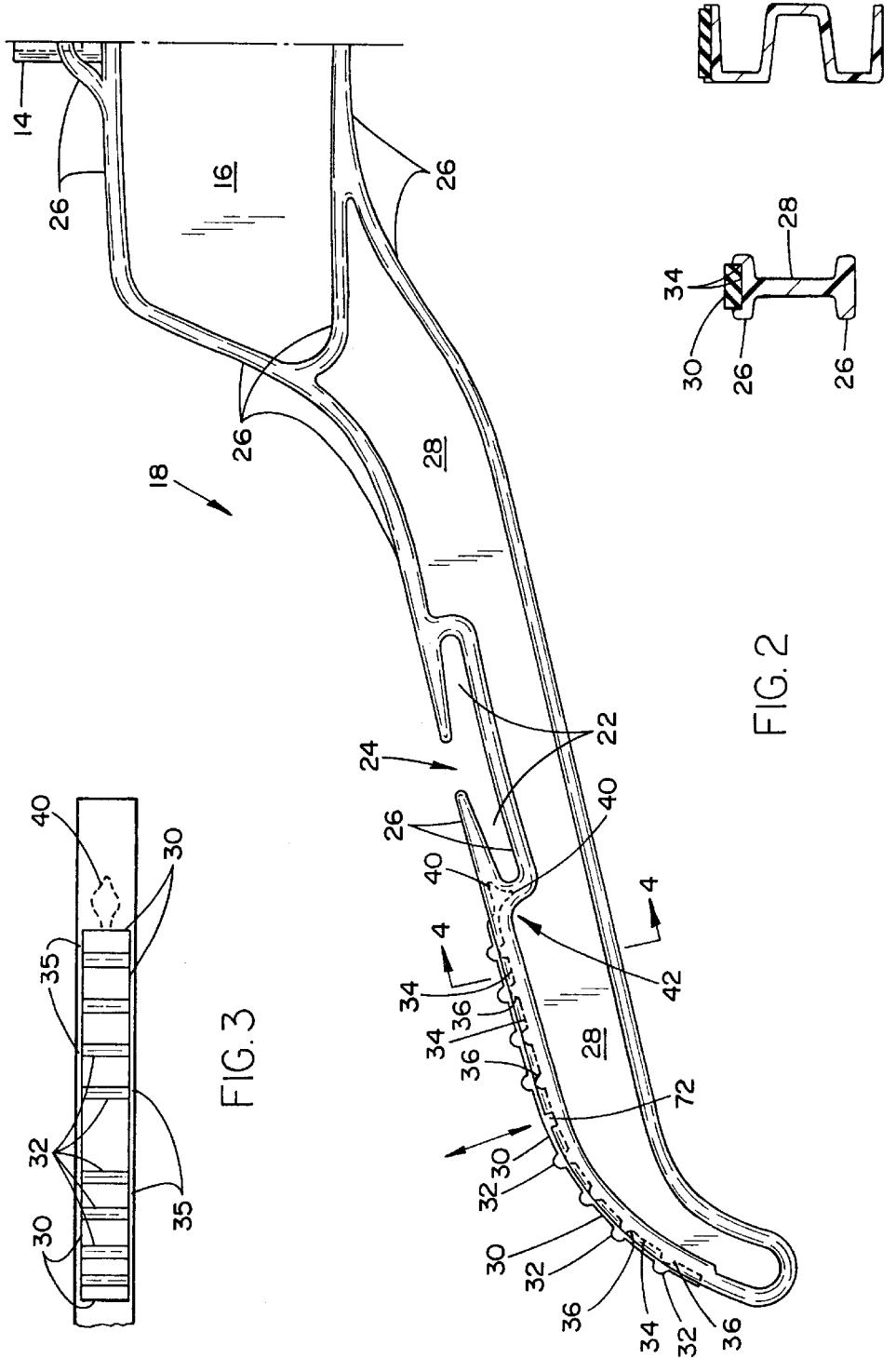

METHOD FOR ANCHORING AN ELASTOMER INTO A THERMOPLASTIC DURING INJECTION MOLDING

FIELD OF THE INVENTION

The present invention relates to coinjected composite garment hangers, and more particularly pertains to a molded plastic garment hanger constituted from two different plastic materials which are coinjected to form a composite garment hanger. Moreover, the subject invention also relates to a novel method for co-injection molding of plastic materials for the formation of a composite plastic garment hanger.

BACKGROUND OF THE INVENTION

In the garment manufacturing and retail industry, plastic garment hangers are widely employed for the purpose of shipping and displaying garments. The plastic garment hangers are frequently of the inexpensive ship-on type whereby the garment is shipped from the manufacturer or wholesaler to the retailer while suspended from the hanger. Generally, such garment hangers are inexpensive single-piece or unitary molded plastic structures which are adapted to be either discarded at the time of sale, or returned to the garment manufacturer, or provided to a customer free of charge in conjunction with the purchase of the garment suspended therefrom.

Garment hangers of that type may be simply constructed as molded plastic structures incorporating a unitary plastic or separate metal central hook portion adapted to be suspended from a suitable support, such as a garment rack or the like, with a hanger body having arms extending in opposite directions from the base of the hook portion so as to facilitate a garment to be suspended therefrom. When needed for a specific use, the opposite or distal ends of the body portion or arms may be formed with suitable grip slots or clip members to enable the attachment of various kinds of garments thereto, such as underwear, slips, brassieres, multiple garments, and the like.

The prior art also includes garment hangers for coats, blazers and other heavier garments which are fitted with pads or rubber strips along the shoulder portions thereof, or non-slip adhesive coatings on the pants bar to assist in retaining the garment on the hanger.

U.S. Pat. No. 4,655,867 to Berkovits discloses a garment hanger having a non-slip strip of resilient material adhesively secured to the shoulder portions of the hanger.

U.S. Pat. No. 4,606,482 to McHugh discloses a rod-type garment hanger having a preformed sleeve of non-slip protective material which is slipped over the rod portions of the hanger to assist in retaining a garment on the hanger.

U.S. Pat. No. 4,058,241 to Craig discloses a tightly braided cover which is plaited around the periphery of a garment hanger to provide protection for the garment and to prevent garment slippage from the hanger.

U.S. Pat. No. 5,020,705 to Garrison discloses a garment clamping hanger which has garment gripping pads molded of a synthetic rubber which has a high coefficient of friction when firmly pressed against a fabric and avoids marking or adhering to the fabric of a garment.

Some prior art garment hangers, such as Garrison U.S. Pat. No. 5,020,705, have incorporated a coating of particles of high friction material such as rubber to improve the garment gripping capabilities thereof. Hangers using high friction gripping pads have experienced several problems. Functionally, one of the major problems has been that of delamination of the gripping pad from the hanger. This problem becomes more acute when the hangers are used for heavy garments and even more so when the hanger is intended for repeated reuse or for transportation where it has to sustain the additional strain of repeated, abrupt, vertical movements often experienced in transit.

Another factor which has materially restricted their use is cost. Making the hanger in two separate operations, that is, first assembling or molding the hanger body and later bonding the garment gripping pads to the body involves labor costs which are not acceptable in the highly competitive hanger manufacturing business. Another factor has been the problem of developing a pad which will provide the necessary gripping function and, at same time, have sufficient body durability and strength to withstand the rigors and demands of commercial usage. Past experience has indicated that rubber pads, either natural or synthetic, which have the required frictional gripping ability are not structurally capable of withstanding either repeated or rough usage. Heretofore, when the material had durability, it lacked the necessary frictional characteristics and vice versa.

The prior art also discloses numerous kinds of apparatus and methods for molding two-component plastic materials by a two-step or co-injection process. However, these have not been specifically applied to the production of two-component or composite plastic garment hangers of the types considered herein.

U.S. Pat. No. 4,416,602 to Neumeister discloses an injection molding apparatus for manufacturing articles from different types of plastic materials, in which a first plastic material is injected into a mold to form a frame member or the like, and thereafter subsequent to cooling and solidifying of the molten plastic material, a second plastic material is injected into the cavity of the mold so as to form an insert within an aperture of the frame member provided by the first plastic material, thereby fusing the plastic materials and forming a mechanical bond therebetween.

In U.S. Pat. No. 5,020,705 to Garrison, garment gripping pads of hanger clips are molded substantially simultaneously with the hanger so as to chemically bond with the material of the hanger. The hanger is molded with the front and rear jaws of the clip in an open position. When the mold is closed each cavity in which a pad is to be formed is occupied by a cam. While the cams are occupying the cavities for the pads, the hanger forming resin is injected into the mold to fill the entire mold except for the spaces occupied by the cams. After the resin has sufficiently set, the cams occupying the pad forming cavities are withdrawn (upwardly) and the resin to form the pads is injected through an opening 27. To avoid resin migration, the opening is very small and a tab gate 47 is provided between the parting line and the opening such that when the hanger is ejected from the mold, the resin is sheared by the tab gate from the resin remaining in the conduit.

Similar types of molding apparatus and methods are disclosed in various patent publications, representative of which are U.S. Pat. No. 4,711,621 to Schomblond disclosing a mold for producing composite bodies from different plastic materials, U.S. Pat. No. 4,335,068 to Hemery, and U.S. Pat. No. 3,577,596 to Bullard et al.

SUMMARY OF THE INVENTION

The present invention relates to coinjected composite plastic hangers, and a method of coinjection of the composite plastic hangers. Various desirable attributes for hangers may be created in a coinjected composite plastic hanger which are not available to a hanger molded from a single plastic. The composite plastic hanger can be formed with plastic coinjected members such as integrally molded non-slip portions to retain garments on the hangers.

The second plastic material for the plastic coinjected member which is molded into the basic hanger structure is generally produced in the same mold for producing the basic hanger structure through a co-injection method, which is performed subsequent to the initial molding and cooling of the basic hanger structure so as to cause the plastic coinjected member to fuse and bond with the contacting surfaces of the plastic material for the basic hanger structure. This bond may be a mechanical bond, a plastic molded bond, a fusion bond or a combination thereof, depending on the plastics selected, and the relative injection, set and cool cycles and times of the coinjection machine. This imparts a versatility to the construction and utilization of such garment hangers inasmuch as a single mold with a movable core can be employed for forming the entire composite plastic garment hanger construction, and the mold may be modified with regard to the formation of the plastic coinjected member.

For this purpose, the subject invention also contemplates a two-step molding procedure or, in essence, a co-injection plastic molding method whereby plastic materials of different types and/or colors may be readily employed so as to have a first plastic material of a specified type and color form the basic hanger structure, cooled to some extent within the mold so as to at least partially solidify. Thereafter, a mold core is movable into a position which uncovers an injection inlet for a further or second plastic material which may be a different color and/or material type, and through which the second plastic material is coinjected to form the plastic coinjected member with a plume of the second plastic material which extends into and is fused and bonded with the plastic material of the basic hanger structure so as to provide a permanent connection therebetween.

The present invention also provides a coinjected garment hanger having a non-slip plastic material which is molded and bonded to the shoulder portions of the hanger to prevent slippage of a garment from the hanger.

Another object of the present invention is to provide a coinjected composite plastic garment hanger which incorporates a non-slip insert consisting of a second plastic material that is softer and more adherent and stickier than the garment hanger body, which insert is fused to the basic hanger structure so as to form a fused plastic and mechanical bond with the first plastic material constituting the basic garment hanger.

BRIEF DESCRIPTION OF THE DRAWINGS

The foregoing and other objects of the invention may now be more readily ascertained from the following detailed description of preferred embodiments thereof, taken in conjunction with the accompanying drawings, in which:

FIG. 2 illustrates a more detailed view of one half of the coinjected garment hanger of FIG. 1, with the second half of the garment hanger being generally a complementary mirror image of the first half shown in FIG. 2.

FIG. 3 is a top plan view of the end of the non-slip insert formed on the left projecting arm of the coinjected garment hanger of FIGS. 1 and 2.

FIG. 4 is a cross sectional view of the hanger arm and garment gripping pad taken along sectional arrows 4—4 in FIG. 2.

FIG. 5 is a cross sectional view of an alternative embodiment of a hanger arm and garment gripping pad pursuant to the present invention.

DETAILED DESCRIPTION OF THE INVENTION

Figure 1:
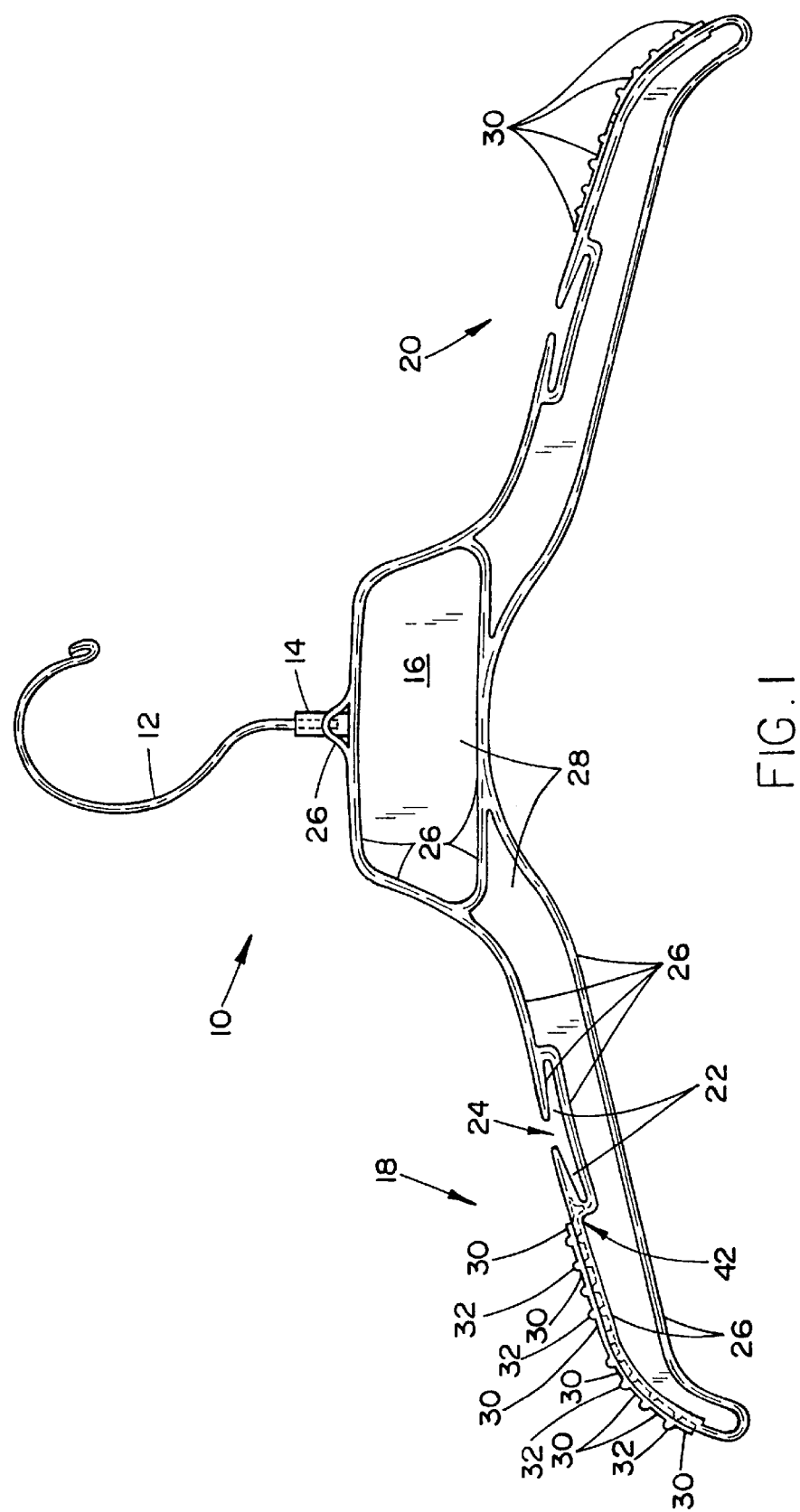
FIG. 1 illustrates a side elevational view of a composite coinjected garment hanger pursuant to the present invention which has a molded plastic body incorporating non-slip plastic inserts in the shoulder portions thereof.

Referring to the drawings in detail, FIG. 1 illustrates a side elevational view of a composite coinjected plastic garment hanger 10 constructed pursuant to the present invention. FIG. 2 illustrates a more detailed view of one half of the composite coinjected garment hanger of FIG. 1, with the second half of the garment hanger being generally a complementary mirror image of the first half shown in FIG. 2. FIG. 3 is a top plan view of the end of the non-slip plastic insert formed on the left projecting arm of the garment hanger of FIGS. 1 and 2, and FIG. 4 is a sectional view of the hanger arm and garment gripping non-slip plastic insert taken along sectional arrows 4—4 in FIG. 2.

FIG. 1 illustrates a side elevational view of a composite coinjected plastic garment hanger 10 incorporating non-slip plastic inserts 30 on each shoulder of the hanger. The composite hanger has a molded plastic body portion and a centrally located metal hook 12 arranged to suspend the hanger from a hanger support bar or the like. The molded plastic body extends outwardly and downwardly from the lower end of the hook member with outwardly extending arms 18, 20. Each of the arms 18, 20 has an integrally molded non-slip plastic insert layer 30 which forms the upper top portion of the shoulder of each of the hanger arms 18, 20.

The garment hanger 10 includes a central metal hook portion 12 which is theaddly engaged into an upwardly extending cylindrical neck 14 defined in a central portion 16 of the hanger body, and further includes a pair of coplanar oppositely extending arms 18 and 20 for suspending one or more garments, as is well known in the art. Each arm defines near the central top thereof a longitudinally extending recess 22 having a central upper opening 24, the function of which is to receive therein straps or other components of a garment to assist in supporting a garment on the hanger, as is well known in the art. The distal ends of each of the arms 18 and 20 may, if desired, be equipped with suitable garment gripping or clip structures, for example as disclosed in U.S. Pat. No. 4,623,079 to Tendrup et al., or alternatively may be of a simple rounded end configuration to merely permit the hanging suspension of a garment rather than fastening the garment to the hanger. In an alternate embodiment, the central hook portion can be integrally molded of plastic with the hanger body, as is well known in the art.

The body of the garment hanger is generally strengthened and reinforced by a wide flange 26 which extends across the thickness of and generally around the outer perimeter of the garment hanger. The flange 26 extends upwardly in a rounded fashion at the hook-supporting neck 14, and extends around the central hook-supporting section 16 of the hanger, and further extends around the perimeter of each arm 18, 20 and around the perimeter of each garment-receiving longitudinal recess 22. The central portion of the garment hanger extending between the upper and lower flanges 26 is formed by a centrally positioned, relatively thin, vertically extending web 28, as best shown in FIG. 4. The top and bottom wide flanges 26 and the thin central web 28 form a construction similar to an I beam, as best shown in FIG. 4, which provides structural strength for the hanger and support for a garment.

In alternative embodiments, the body of the garment hanger could have alternative cross section constructions, such as an M shaped cross section as illustrated in FIG. 5, or some other reinforcing structural cross section such as a C shaped cross section.

The garment hanger includes a garment gripping non-slip plastic insert or pad 30 which is molded into and mechanically and fusedly bonded into the top of each end of the oppositely directed shoulder portions of the arms 18, 20. The garment gripping pads 30 are co-injected of a second plastic material with the primary plastic material which forms the basic hanger body structure of the garment hanger. The garment gripping pads 30 are formed of a softer and more resilient and adherent second plastic material than the first primary plastic material, such that a garment supported on the garment gripping pads is more frictionally and resistively gripped by, and less likely to slip or slide relative to, the garment gripping pads.

FIGS. 2, 3 and 4 taken together illustrate the shape and nature of each garment gripping pad 30 and its interrelationship with the hanger arm 18, 20. Each garment gripping pad 30 includes a number, e.g. 8, of spaced, transversely extending ribs 32 which are designed to increase the garment gripping ability of the garment gripping pad. Each transversely extending rib 32 defines a generally semicircular shaped top, as illustrated in FIGS. 1 and 2, although other shapes are also possible in alternative embodiments, with a criteria being that the shape of the top should not include any undercuts, for reasons explained below in relation to the co-injection process by which the garment hanger is produced. The garment gripping pad 30 extends across most of the width of the top of the hanger arm, as illustrated in FIGS. 3 and 4, and is molded to fit within a generally curved (along the direction of curvature of each arm) rectangular shaped recess 34, having spaced side upper edges 35, and defined within the top of the end of the hanger arm, with the garment gripping pad projecting slightly above the rectangular recess, as shown in FIGS. 1, 2 and 4.

The bottom of the rectangular recess 34 defines a number, e.g. 8, of spaced, transversely extending ribs 36 projecting upwardly from the bottom of the recess which are identical to the number of spaced, transversely extending ribs 36 defined in the top of the garment gripping pad, for reasons explained below with respect the co-extrusion molding process used to produce the garment hanger. The transversely extending ribs 36 in the bottom of the recess also function to increase the surface area in the bottom of the recess which contacts the second plastic material of the co-injected garment gripping pad to increase the surface area of the fused plastic and mechanical bond between the garment gripping pad 30 and the main plastic structure of the garment hanger.

A unique feature of the present invention is the presence of a plume 40 of the second plastic material of the garment gripping pad 30, as shown best in FIGS. 2 and 3, which extends from the inner end of the garment gripping pad into the first plastic material forming the main body structure of the garment hanger and which assists in anchoring and securing the garment gripping pad 30 into the main body structure of the garment hanger.

The outer end of the longitudinally extending recess 22 formed near the top center of the arm 18, 20 defines a somewhat enlarged volume portion 42 where the flange 26 forming the top of the longitudinally extending recess 22 joins the flange 26 forming the bottom of the longitudinally extending recess 22 adjacent to the inner end of the coinjected garment gripping pad. During molding of the main plastic body member, the surfaces of the first plastic material are partially set and hardened, and the first plastic material in the enlarged volume portion remains relatively unset and not completely hardened. Subsequently, during molding of the second plastic material forming the garment gripping pad 30, the coinjected and pressurized second plastic material breaches the surface of the partially set and hardened first plastic material at the enlarged volume portion and forms a plume of the second plastic material which extends into and displaces the relatively unset and not hardened first plastic material in the enlarged volume portion to anchor and secure the plume of the second plastic material into the first plastic material in the enlarged volume portion.

Figure 6:
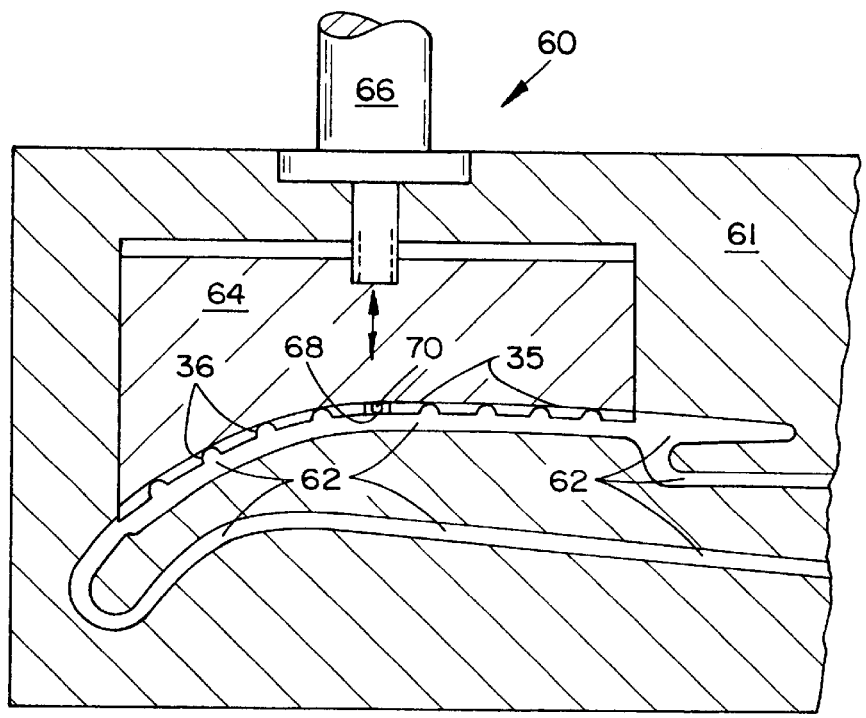
FIG. 6 illustrates a fragmentary schematic plan view of a mold cavity for forming a composite coinjected plastic garment hanger pursuant to the invention with a movable mold cote in a first operative position.
Figure 7:
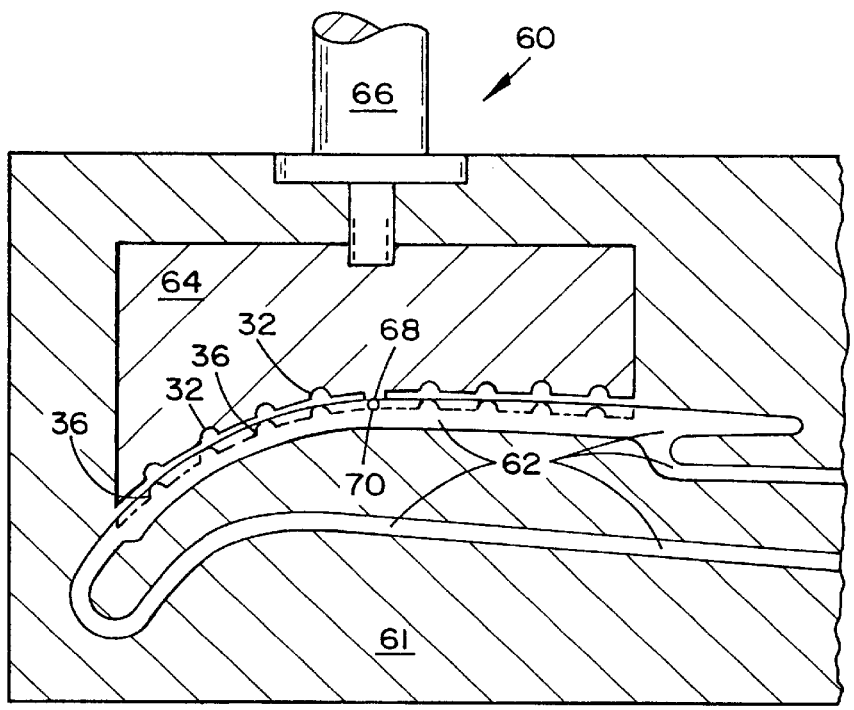
FIG. 7 illustrates a view similar to FIG. 6 showing the mold cavity with the movable mold core in a second operative position for forming the composite coinjected plastic garment hanger of the present invention.

The entire composite coinjected hanger structure can be molded in a co-injection mold 60 as shown diagrammatically in FIGS. 6 and 7 of the drawings. The co-injection mold 60 includes first and second symmetrical mold members 61 which are joined along the planes of FIGS. 6 and 7, and each of the first and second mold members 61 forms and molds one half of a mold cavity 62 which is shaped in the general shape of the garment hanger 10 body as described above. The plastic mold 60 is also equipped with a movable mold core 64 positioned between the first and second mold members, which is translatable between first and second positions, illustrated respectively in FIGS. 6 and 7, by a linear actuator 66, which can be a pneumatic or hydraulic reciprocating piston and cylinder. The movable mold core 64 is initially positioned in the position shown in FIG. 6 when the first plastic material in a molten state is injected therein so as to form the basic hanger body structure, including the curved rectangular recess 34, having the spaced side upper edges 35, and the transversely spaced, upwardly extending ribs 36 defined on the bottom of the rectangular recess 34. During the first step of the molding operation, the first plastic material is injected through one or more primary injection inlets, as is well known in the art, to form the major portion of the garment hanger body structure, during which a downwardly extending square or rectangularly shaped projection 68 of the movable mold core 64 covers and seals off a second injection inlet 70, through which the second plastic material forming the garment gripping pad is subsequently injected.

The projection 68 is positioned on one side of the rectangular recess 34 and near the center of the length thereof, and extends downwardly into one side upper edge 35 to form a generally square or rectangularly shaped small access aperture 72, FIG. 2, on one side of and near the center of the length of the rectangular recess, the function of which is to allow the second plastic material forming the garment gripping pad to be injected through the second injection inlet 70 and through the aperture 72 to form the garment gripping pad after the movable mold core has been retracted to the position of FIG. 7.

After the plastic from the primary source feeder has completely filled the mold cavity 62, a second mold cycle is begun in which the movable mold core 64 is withdrawn from the position of FIG. 6 to the position of FIG. 7, which allows a second plastic material to be injected through the second injection inlet 70 and through the aperture 72 and into the expanded mold cavity formed by retraction of the mold core from the position of FIG. 6 to the position of FIG. 7. To prevent wasted plastic material which is environmentally disadvantageous, in a preferred embodiment the conduit extending to the injection inlet 70 is a hot runner rather than a tunnel gate and conventional runner. The residence time of the movable core 64 within is dependent upon the type of plastics being used, the operating temperatures, the cycle time, and the type of bond desired between the insert and the plastic hanger body. After the second plastic material fills the expanded mold cavity, the mold 60 is cooled, the side mold members 61, 61 are separated, and the newly formed hanger is ejected from mold cavity by means of ejector pins (not shown).

After the first molding step is completed with regard to the injection of the first plastic material into the mold cavity 62 for the main hanger body structure, the mold core 64 is linearly displaced and retracted by the linear actuator 66 to the position as shown in FIG. 7. The retracted mold core 64 preferably closes off the injection inlet(s) for the first plastic material and simultaneously uncovers the injection inlet 70 for the second plastic material, and the second plastic material is then coinjected into the mold cavity through the second injection inlet 70 and the access aperture 72. The second plastic material fills the expanded mold cavity void formed within the mold cavity when the mold core 64 is fully retracted to the position of FIG. 7 to produce the garment gripping pad 30.

The movable mold core 64 molds the transversely extending top ribs 32 of the garment gripping pad 30 when it is in the position shown in FIG. 7, and also molds the transversely extending bottom ribs 36 defined in the bottom of the recess 34 when it is in the position shown in FIG. 6, which is why the pattern of the transversely extending ribs 32 is substantially identical to the pattern of the transversely extending ribs 36. The pattern of transversely extending ribs is provided to enhance the ability of the garment gripping pad to grip and secure garments thereto, but also functions to enhance the mechanical and fused plastic securement of the garment gripping pad 30 to the main body of the garment hanger, by providing an irregular mechanical pattern with increased surface area to provide an increased mechanical and fused plastic bond between the two plastic materials.

The movable mold core 64 must be able to move freely between its extended and retracted positions, and for that reason, the pattern of transversely extending ribs does not include any undercuts in the pattern.

A typical co-injection process for forming a garment hanger as illustrated herein has an overall cycle time of 20 seconds, during which a plastic material forming the main structure of the garment hanger, which can be a KR01–KR03 grade K-resin, as is commercially available from Phillips, is typically injected at a temperature of 400 degrees F. and a pressure of 800 psi to form the main body structure of the garment hanger. Thereafter, the movable mold core 64 is moved and retracted to uncover the second injection inlet 70 to allow co-injection of the second overmold material forming the garment gripping pad. The second overmold material might typically be DUPX-35445, Grade 1010, or Chevron 2205, and is typically injected at a temperature of 250–300 degrees F. and a pressure of 800 psi during a 1–2 second injection time to form the garment gripping pad, with a typical overall cycle time to form the coinjected garment hanger of 20 seconds.

One specific co-injection process for forming a garment hanger with a plume as shown in FIGS. 2 and 3 had an overall cycle time of 15.12 seconds, during which a first plastic material forming the main structure of the garment hanger, KR03, as is commercially available from KResin, was injected at a temperature of 360 degrees F. and a pressure of 1320 psi to form the main body structure of the garment hanger. Thereafter, the mold was cooled for a period of 10 seconds, after which the movable mold core 64 was retracted to allow co-injection of the second overmold material forming the garment gripping pad. The second overmold material VA8.18 EVA, as is commercially available from Matrix Polymers, was injected at a temperature of 440° degrees F. and a pressure of 727 psi to form the garment gripping pad.

Commercially available equipment has been specifically adapted to mold the composite hanger of the present invention. An adapted Nissei 150 ton injection molding machine was used to inject the primary material comprising the hanger body and an adapted injection cylinder from a Boy 10 injection molding machine was used to inject the secondary material comprising the non-slip layer.

The primary material used in this instance is a combination of Dow styrene grades 693 and 478. The secondary material is a D grade material available from Shell Oils which has a trade name of Kraton. The melt temperature of the Kraton is about 600☐ F., plus or minus 50☐ F. The size of the second injection orifice is about 0.062 inches in diameter, however, this size will vary with the design of the hanger and the second material type.

The mold is cooled during setting periods of the co-injection process to reduce the overall cycle time and speed production. However, after injection of the first plastic material forming the main structure of the garment hanger body, the first plastic material in the interior of the enlarged volume portion 38, formed at the junction of the top and bottom flanges 26 of the garment-receiving slot 22 adjacent to the inner end of the rectangular recess 34, does not cool and set completely because of the rather large volume defined at that junction. The subsequent pressurized co-injection of the second plastic material causes the pressurized second plastic material to breach the surface of the first plastic material at the location of the enlarged volume portion 38, to form a plume 40 of the second plastic material which displaces and bonds to the not completely set first plastic material inside the enlarged volume portion. The injected plume 40 of the second plastic material in the large volume portion of the first plastic material expands to a larger diameter and volume then the breach entry passageway and serves to anchor and bond the garment gripping pad to the main body of the garment hanger.

The bond between the non-slip garment gripping pad and the main body of the garment hanger is a combination of a fused plastic bond and a mechanical bond, and is supplemented by the bond between the plume and the first plastic material in which the plume is embedded. The factors which determine the type of bond include the chemical compatibility of the plastics involved, the melting and fusing temperatures of the respective plastics involved, the temperatures at which the plastics are injected into the respective mold cavities, the temperature at which the cavity is maintained, and the respective dwell time between the injection of the first plastic and the removal of the mold insert and the injection of the second plastic. By adjusting the parameters of the process, one may achieve a mechanical bond, a plastic molded bond, or a wholly fused bond wherein the surface layers of the plastics have intermixed with each other.

From the foregoing illustrations it is readily apparent that the present invention is directed to an extremely simple composite garment hanger construction, preferably produced in a coinjection mold in a simple two step process which requires a minimum amount of effort and expenditure, while being versatile in its applications due to the specific structural aspects of the members. No costly hand labor is required to affix the non-slip strips to the shoulders of the hangers, which is accomplished in a single molding operation.

The plastic materials which can be employed with the molding operation in order to produce the inventive composite molded plastic hanger may include, but are not limited to, plastic materials such as polystyrene, SAN, ABS, PPO, nylon, polypropylene, polyethylene, PET, polycarbonates, acrylics, K resin, and PVC among others, each being provided with specific coloration in conformance with the specific demands of the customer. When it is desired to mold composite hangers with the nonslip inserts, polypropylene and polyethylene primary materials may be combined with ethylene vinyl acetate, low density polyethylene, or thermoplastic elastomers for the non-slip layer. Alternately, if polystyrene, ABS or SAN primary materials are desired, they may be combined with ethylene vinyl acetate, PVC, thermoplastic elastomers or thermoplastic rubbers. Other materials suitable for the primary body construction such as PVC, PC, PMMA or a mixture of a polystyrene with one of the foregoing primary materials may be used with EVA, PVC, thermoplastic elastomers or thermoplastic rubbers and the non-slip insert material.

In one preferred embodiment, styrene or polypropylene is used as the primary material with a softer material (such as a thermoplastic rubber including, but not limited to, Kraton) used for the insert. In another embodiment a harder material can used as the insert including, but not limited to, polyethylene with a propylene membrane.

More particularly, when a chemical bond is desired, it is preferable to use styrene main as the primary material with styrene or polypropylene main as the primary material with EVA/PP mix. When a chemical and mechanical bond is desired, it is preferable to use styrene main as the primary material with styrene rubber. When a mechanical bond is desired, it is preferable to use polypropylene main as the primary material with polyethylene.

While there have been shown and described what are considered to be the preferred embodiments of the invention, it will, of course, be understood that various modifications and changes in form or detail can readily be made without departing from the spirit of the invention. It is therefore intended that the invention not be limited to the exact form and detail herein shown and described nor to anything less than the whole of the invention herein disclosed as hereinafter claimed.

What is claimed is:

1. A coinjected plastic garment hanger comprising:
a hook member for suspending the garment hanger from a support;
a molded plastic body member formed of a first plastic material and attached to said hook member to support a garment therefrom; and
a coinjected plastic member formed of a second plastic material and molded into the plastic body member and secured thereto by a plume of the second plastic material of the coinjected plastic member which is formed as the second plastic material is coinjected and breaches the surface of the first plastic material of the molded plastic body member which is not completely set and hardened, to form the plume of the second plastic material which extends into and is secured and anchored into the first plastic material.

2. The coinjected plastic garment hanger of claim 1, wherein the coinjected plastic member comprises a non-slip strip molded into a surface of the molded plastic body member to assist in retaining a garment thereon.

3. The coinjected plastic garment hanger of claim 2, wherein the coinjected non-slip strip is molded into the surface of the molded body member by mechanical and fusion bonding formed between the non-slip strip and the body member.

4. The coinjected plastic garment hanger of claim 2, wherein the second plastic material is a softer and more resilient and adherent plastic material than the first plastic material, such that a garment supported on the non-slip strip is more frictionally and resistively gripped by, and less likely to slip or slide relative to, the non-slip strip.

5. The coinjected plastic garment hanger of claim 2, wherein the non-slip strip includes a number of spaced, transversely extending ribs which are designed to increase the garment gripping ability of the non-slip strip.

6. The coinjected plastic garment hanger of claim 5, wherein the non-slip strip extends across most of the width of the top of the garment hanger, and is molded to fit within a generally rectangular shaped recess having spaced side upper edges and defined within the top of the garment hanger, with the non-slip strip projecting slightly above the rectangular recess.

7. The coinjected plastic garment hanger of claim 6, wherein the bottom of the rectangular recess defines a number of spaced, transversely extending ribs projecting upwardly from the bottom of the recess which are identical to a number of spaced, transversely extending ribs defined in the top of the non-slip strip.

8. The coinjected plastic garment hanger of claim 1, wherein the molded plastic body member defines an enlarged volume portion adjacent to the coinjected member, such that during molding of the molded plastic body member the surfaces of the first plastic material are partially set and hardened, and the first plastic material in the enlarged volume portion remains relatively unset and not hardened, and during molding of the second plastic material, the coinjected and pressurized second plastic material breaches the surface of the partially set and hardened first plastic material at the enlarged volume portion and forms the plume of the second plastic material which extends into and displaces the relatively unset and not hardened first plastic material in the enlarged volume portion to anchor and secure the plume of the second plastic material into the first plastic material in the enlarged volume portion.

9. The coinjected plastic garment hanger of claim 1, wherein the molded plastic body member includes first and second arms which extend outwardly and downwardly from the hook member, and a coinjected non-strip is integrally molded into the top surface of each of the first arm and the second arm.

* * * * *